(12) United States Patent
Starosta et al.

(10) Patent No.: US 10,990,432 B1
(45) Date of Patent: Apr. 27, 2021

(54) METHOD AND SYSTEM FOR INTERACTIVE CYBER SIMULATION EXERCISES

(71) Applicant: Ila Corporation, Plantation, FL (US)

(72) Inventors: Bernardo Starosta, Plantation, FL (US); Elias Benarroch, Plantation, FL (US)

(*) Notice: Subject to any disclaimer, the term of this patent is extended or adjusted under 35 U.S.C. 154(b) by 133 days.

(21) Appl. No.: 16/205,217

(22) Filed: Nov. 29, 2018

Related U.S. Application Data

(60) Provisional application No. 62/593,016, filed on Nov. 30, 2017.

(51) Int. Cl.
*G06F 9/455* (2018.01)
*H04L 12/24* (2006.01)

(52) U.S. Cl.
CPC ........ *G06F 9/45558* (2013.01); *H04L 41/145* (2013.01); *G06F 2009/4557* (2013.01); *G06F 2009/45562* (2013.01); *G06F 2009/45575* (2013.01)

(58) Field of Classification Search
CPC .................................................. G06F 9/45533
USPC ........................................................... 718/1
See application file for complete search history.

(56) References Cited

U.S. PATENT DOCUMENTS

| | | |
|---|---|---|
| 6,651,080 B1 | 11/2003 | Liang et al. |
| 6,820,214 B1 | 11/2004 | Cabrera et al. |
| 6,850,953 B1 | 2/2005 | Deshpande et al. |
| 7,093,086 B1 | 8/2006 | van Rietschote |
| 7,146,305 B2 | 12/2006 | van der Made |
| 7,162,724 B2 | 1/2007 | Blaser et al. |
| 7,437,764 B1 | 10/2008 | Sobel et al. |
| 7,664,626 B1 | 2/2010 | Ferrie |
| 8,046,550 B2 | 10/2011 | Feathergill |
| 8,151,263 B1 | 4/2012 | Venkitachalam et al. |
| 8,161,479 B2 | 4/2012 | Sedukhin et al. |
| 8,205,194 B2 | 6/2012 | Fries et al. |
| 8,225,281 B1 | 7/2012 | Hardinger et al. |
| 8,413,216 B2 | 4/2013 | Hughes et al. |
| 8,555,393 B2 | 10/2013 | Davis et al. |
| 8,839,426 B1 | 9/2014 | Brueckner et al. |
| 8,943,203 B1 | 1/2015 | Lent et al. |
| 8,990,806 B2 | 3/2015 | Morariu et al. |
| 9,069,782 B2 * | 6/2015 | Yang ...................... G06F 21/53 |

(Continued)

*Primary Examiner* — Mehran Kamran
(74) *Attorney, Agent, or Firm* — Spectrum Intellectual Property Law; David P. Kohn

(57) ABSTRACT

An invention is provided to efficiently create, deploy and conduct highly realistic and interactive cyber simulation exercises. In the invention, a collection of virtual machines and associated resources (such as compute, storage, and networking) can be modified by a simulation author by adding components and/or executing actions that will make up stage(s) in each exercise(s) required by a simulation, where a simulation is a collection of exercises and stages. When saved, a stage becomes part of an exercise and can be deployed to a workspace. Participants in the simulation use the workspace to achieve a mission associated with each stage. The invention uses replicas of real life computing environments, where these replicas are adapted for participant interaction, and where these replicas comprise logical elements such as startup sequences of individual components. The invention can also provide features such as zero overhead data copy (ZODC) and/or parallelized data ingestion.

4 Claims, 5 Drawing Sheets

(56) References Cited

U.S. PATENT DOCUMENTS

| | | |
|---|---|---|
| 9,473,522 B1 | 10/2016 | Kotler et al. |
| 9,571,517 B2 | 2/2017 | Vallone et al. |
| 9,703,956 B1 | 7/2017 | Watson et al. |
| 9,710,653 B2 | 7/2017 | Kotler et al. |
| 9,823,940 B2 | 11/2017 | Arcese et al. |
| 9,838,416 B1 | 12/2017 | Aziz |
| 9,860,261 B2 | 1/2018 | Halfon et al. |
| 9,910,993 B2* | 3/2018 | Grossman ............... G06F 21/55 |
| 9,954,884 B2* | 4/2018 | Hassell ............... H04L 63/1441 |
| 9,983,951 B2 | 5/2018 | Lad et al. |
| 10,079,850 B1* | 9/2018 | Patil ..................... G06F 21/577 |
| 10,097,573 B1 | 10/2018 | Aziz |
| 10,518,162 B2* | 12/2019 | Morton .................. G09B 9/003 |
| 2006/0191010 A1* | 8/2006 | Benjamin ........... H04L 63/1433 726/23 |
| 2007/0124461 A1* | 5/2007 | Kryskow, Jr. ....... H04L 41/0896 709/224 |
| 2009/0007270 A1* | 1/2009 | Futoransky ......... H04L 63/1433 726/25 |
| 2009/0319247 A1* | 12/2009 | Ratcliffe, III ....... H04L 63/1433 703/13 |
| 2011/0035803 A1* | 2/2011 | Lucangeli Obes ......................... H04L 63/1433 726/25 |
| 2011/0126207 A1* | 5/2011 | Wipfel ................ H04L 63/0815 718/104 |
| 2011/0185432 A1* | 7/2011 | Sandoval ............. H04L 41/145 726/25 |
| 2011/0314465 A1* | 12/2011 | Smith .................... G06F 9/5077 718/1 |
| 2012/0072968 A1 | 3/2012 | Wysopal et al. |
| 2012/0167084 A1* | 6/2012 | Suit ..................... G06F 11/3495 718/1 |
| 2012/0323853 A1 | 12/2012 | Fries et al. |
| 2013/0152077 A1 | 6/2013 | Leitman et al. |
| 2014/0046645 A1* | 2/2014 | White .................... H04L 41/145 703/13 |
| 2015/0309831 A1 | 10/2015 | Powers et al. |
| 2016/0036636 A1* | 2/2016 | Erickson ............... H04L 41/145 370/248 |
| 2016/0110213 A1* | 4/2016 | Chen .................... G06F 9/45558 726/1 |
| 2016/0301710 A1 | 10/2016 | Hason |
| 2016/0342499 A1* | 11/2016 | Cheng ................. G06F 11/3664 |
| 2017/0046519 A1* | 2/2017 | Cam ....................... G06N 7/005 |
| 2017/0126712 A1 | 5/2017 | Crabtree et al. |
| 2017/0148347 A1* | 5/2017 | Stinson .................... G09B 9/00 |
| 2017/0155569 A1* | 6/2017 | Chinnaswamy ........ H04L 41/12 |
| 2017/0180421 A1* | 6/2017 | Shieh ..................... H04L 63/10 |
| 2017/0228246 A1* | 8/2017 | Kotha .................. G06F 9/45558 |
| 2017/0304707 A1* | 10/2017 | Morton .................... G09B 7/00 |
| 2018/0088932 A1* | 3/2018 | Ouarraoui ........... G06F 9/44505 |
| 2018/0113979 A1* | 4/2018 | McCondochie ....... G16H 10/60 |
| 2018/0165621 A1* | 6/2018 | Guo ............... G06Q 10/063114 |
| 2018/0248905 A1* | 8/2018 | Cote .................... G06K 9/6269 |
| 2018/0295154 A1 | 10/2018 | Crabtree et al. |
| 2019/0066530 A1* | 2/2019 | Lee ....................... A63F 13/85 |
| 2020/0106696 A1* | 4/2020 | Michael ................ H04L 45/24 |

* cited by examiner

CYBER WAR GAME PREPARATION PROCESS

Scenario Selection → Scenario Validation → Environment Duplication/Ingest → Exercise Preparation → Exercise Execution

| Step | Method |
|---|---|
| 1. Select a representative group of VMs for the CyberVR exercise | • Use VM application dependency finders* to identify VMs supporting services documented in the BIA<br>• Validate or create a startup sequence* for the selected service(s) using the DR environment if available<br>• Identify the service validation mechanism* to determine that the selected service is operating as expected |
| 2. Model the user network in the virtualized environment | • Use a network discovery application* to produce an equivalent network* and implement it in the virtual realm |
| 3. Create a fast* high fidelity copy* of the environment in #1 into a special-purpose low footprint data center in a box* | • Use hyper converged infrastructure capable of in-line deduplication and zero overhead data copies* to receive the source environment (#1 and #2) into a self contained easily deployable system (SCEDS)* that can be rented or owned by the customer*.<br>• The high fidelity copy can be made from the production environment or from the existing DR environment*<br>• The SCEDS ingest mechanism* includes making the SCEDS visible to the site production or DR network so that it can be populated |
| 4. Validate/create the startup sequence | Validate the startup sequence* identified in the production/DR in our self contained environment |
| 5. Validate ingested environment and convert it into a protected gold copy* via ZODC | Use the zero overhead data copy mechanism to create protected copies of the environment that can be quickly and automatically restored to its initial state* |

FIG. 3

CYBER WAR GAME PREPARATION PROCESS

Scenario Selection → Scenario Validation → Environment Duplication/Ingest → Exercise Preparation → Exercise Execution

| STEP | METHOD |
|---|---|
| 1. Select the Stage to be deployed from the Exercise Catalog* | |
| 2. Initiate automatic deployment of the selected stage using the modeled network and participant access | The deployment process uses ZODC to present VMs at the desired exercise stage, starts them in the right sequence, and initiates periodic full backups of the VMs in the stage to support forensics and other post-exercise reviews |
| 3. Participants attempt to achieve the mission using the tools in the original production environment's plus other tools the exercise designer may provide for the specific stage | Participants connect and follow drill instructions |
| 4. During the mission the user has the capability of returning to a previous point-in-time for the complete stage in order to assess a different strategy to achieve the mission or recover from irrecoverable damage sustained during the exercise | |
| 5. Conduct post-stage review after the allotted time and repeat the same stage or move to a different state or exercise | |
| 6. Repeat process for as many stages and exercises as desired. | |

FIG. 5

METHOD AND SYSTEM FOR INTERACTIVE CYBER SIMULATION EXERCISES

RELATED APPLICATIONS

The present application is a continuation of U.S. application Ser. No. 16/205,217, filed on Nov. 29, 2018 and claiming priority from U.S. Provisional Application No. 62/593,016, filed on Nov. 30, 2017.

STATEMENT REGARDING FEDERALLY SPONSORED RESEARCH

Not applicable.

BACKGROUND OF THE INVENTION

1. Field of the Invention

The Invention, CyberVR™ is a Process to efficiently create, deploy and conduct highly realistic and interactive cyber simulation exercises.

2. Description of the Related Art

Interactive simulations of production systems in the Information Technology world rarely reflect realistic environments due to the high cost and complexity required to prepare, deploy, and conduct them using representative systems. In the majority of the cases the exercises are theoretical "table-top" activities, or are based on generic scaled down versions of common application environments. Neither delivers the degree of realism required to provide the high quality actionable information and insight that simulations are designed to provide.

Some companies and technologies provide agility in the cyber world but with a different focus. Virtualization technologies like VMware provide some level of agility to data center operations but is "component" focused. From our research, and corroborated by highly respected industry consultants in this space, up to now nobody has taken a multi-disciplinary approach that combines virtualization, advanced storage technologies, and authoring/simulation methodologies to create a process specifically designed to prepare, deploy, and conduct agile, interactive, and realistic Cyber simulations.

SUMMARY OF THE INVENTION

CyberVR™ is an innovative, useful, and non-trivial Process to efficiently create, deploy and conduct highly realistic and interactive cyber simulation exercises. "Cyber" in this context refers to its most basic definition: "of, relating to, or involving computers".

The process covers:
a. Creation of high fidelity copies of systems in order to provide a high degree of realism in the simulation(s)
b. Provisioning of a highly efficient and agile cyber drill creation workspace* resulting in comprehensive Simulation Catalogs with specialized tools to be invoked for the benefit of participants at each stage of the simulation
c. Deployment of one or multiple simulation(s), each one with one or multiple stages, to maximize domain coverage
d. Ability for participants to move to multiple points in time in each stage of the simulation
e. Provide the information required to conduct post-simulation analysis with participants Advantages of the invention include:
1. Multi-disciplinary Cyber Security War Games:
In this embodiment the CyberVR™ process is used to deliver a realistic Cyber War Game exercise used for testing Response Plans, identifying Capability Gaps, enhancing Preparedness, and promoting Familiarity with People and Tasks through comprehensive cyber security full life cycle simulations
2. Cyber First Responders Training
3. Science specific comprehensive simulations
4. Industry specific event and process simulations (i.e. Patch and upgrade management)

Features and characteristics of the invention appear below.
1. CyberVR™ at a glance
   a. A process that when properly implemented can deliver realistic cyber simulations of specific incidents and/or situations in taking place in an IT environment in an effective manner. Cyber in this context is its most basic definition: "of, relating to, or involving computers"
   b. The process has three main components: create, deploy, and conduct simulations and applies to both interactive and non-interactive engagement mechanisms
   c. Realism is achieved by having participants interact with replicas of real life computing environments
   d. Replicas can be obtained from systems in use or systems at rest and the component VMs organized into application dependency groups. These groups are identified with the help of the application dependency finder.
   e. Efficiency includes factors such as: the
      i. Time: setup the infrastructure, transfer data, create the simulations, execute the simulation
      ii. Cost: time savings translate to less time spent by very high skilled personnel to prepare the simulations and also the time participants will send on the simulation. Cost is also contained by taking advantage of the small footprint repositories used to house CyberVR™ activities and defined in this document
   f. Simulations are designed to assess Response Plans, identify Capability Gaps, enhance Preparedness, promote Familiarity with People and Tasks
   g. The CyberVR™ process includes the preparation, deployment, and execution of the simulations
   h. Replicas of real life computing environments are made possible by the creation of a small footprint repository that is normally deployed on the same premise where the source for the replicas reside. The premise can be an end user facility, or any variation of public, private, or hybrid cloud facilities
   i. Replicas include physical elements such as compute, storage, and networking. They also contain logical elements such as startup sequence of individual components. Startup sequence can be time based or state based
   j. Secure and fast data transfer is made possible achieved by using on premise deployment
   k. Participants in the simulations need to have an interaction mechanism to validate that the objective of the simulation was achieved and/or indicate the changes or enhancements needed to achieve them the next time
2. Replicas
   a. Exact copies of operational systems at a given point in time obtained from either systems in use or systems at rest. This is a key element required to provide realistic simulations.

3. Systems in use
   a. When a replica is made from systems in use it means that a point in time copy is made from running VMs, and that point in time copy will be moved or copied to the repository in a format that makes possible to start that point in time copy as a VM inside the repository
   b. In some cases point in time copies need to be made at the same time of all components in an application dependency group so that when started in the repository the application finds itself in a consistent state
   c. To make possible a consistent state when recuperating an application dependency group it may be required to have a process that stops activity in the whole group. Normally this means that a special order is required to pause the VMs in the application dependency group before issuing the requests for point in time copies
4. Systems at rest
   a. Replicas to be used in CyberVR™ can be created from existing off-line or non-production copies of the VMs required for the simulation. Example of those copies include:
      i. Disaster recovery sites
      ii. Backups
      iii. Clones
      iv. Snapshots
5. Application dependency groups
6. Application Dependency Finder:
   a. Process to discover how different computers, physical or virtual, are dependent on each other to deliver a specific service. This process is performed by combining electronic discovery tools that monitor information exchange between computes (such as VIN from VMware) and review of possible non-electronic dependencies such as file exchanges via USB, tapes, etc.
   b. The process is relevant to CyberVR™ because it helps make sure that systems brought into the CyberVR™ environment represent complete service elements of the production environment.
   c. Customers may have a document called the BIA (Business Impact Analysis) that lists the critical services for the organization. In a step prior to the CyberVR™ ingest, the services to bring into CyberVR™ are identified and then the application dependency finder identified the specific computers involved.
   d. In addition to connectivity information it is also critical to understand the startup and shutdown sequences of the identified application dependency groups
   e. Data flow is also an important element of an application dependency group. By understanding the flow we are able to identify the order in which we need to pause the systems to create application consistent point in time replicas
7. Time based startup
8. State based startup
9. Small footprint:
   a. Small footprint means that the resources required by the CyberVR™ environment should not be a burden to the site where it will be introduced for ingest and operation. Even if it is a burden and not enough resources are available on-premise the resource consumption should be such that the system can be self-powered and cooled so that the only requirement from the site is connectivity and a safe location.
10. Repository
    a. The repository is the computing environment (compute, storage, networking) that will house the replica of the RLCE plus all the variations that are created as part of preparing, deploying, and conducting the simulations. Some of the key characteristics of the repository include:
       i. small footprint relative to the size of the RLCE. This is important as very few organizations will have the funding, space, power, and cooling to create a full size replica
       ii. normally located on premise to avoid RLCE data transfers over potentially insecure remote connections
       iii. most have a temporary and highly controlled connection to ensure security
       iv. is architected to receive content at the maximum sustained data transfer capabilities that the customer allows
       v. needs to be very compact to minimize on premise resource requirements such as space, power, cooling
       vi. Ability to be housed in a standalone unit with its own power and cooling to minimize the on-premise requirements beyond space.
       vii. Include data deduplication and compression in order to have the ability to reduce the number of Terabytes stored and the physical space requirements of the system
       viii. Enhance I/O write speed with either all flash storage and/or the ability to do inline deduplication and compression. The advanced write optimization is an important contributor to achieve the small footprint of the solution as the number of components like controllers, disks, and cabinets can be significantly reduced.
       ix. Provide zero overhead data copy (ZODC) functionally so that many copies and variations of the ingested system can be made during the preparation, deployment, and execution of the simulations.
    b. The access to the Repository should be secured in a similar manner as the systems it is relocating
11. Ingest
    a. Process used to bring into the repository replicas of the real life computing environment (RLCE) to be used in delivering realistic simulations. The critical factors for this process are:
       i. Ability to connect to a realistic source operational environment (in use or at rest) capable of being virtualized if it is not already
       ii. Automated
       iii. Monitored to detect any issues during the process
       iv. Parallelized to maximize data transfer into the repository
       v. Architecture aware to help achieve the small footprint needed to minimize the on-premise resource consumption (space, power, cooling)
12. Real life computing environment (RLCE):
    a. As the term indicates these are exact copies of the systems used in real life by the individuals that will participate in the simulation. As part of the CyberVR™ process these systems will be slightly modified by the simulation authors to create the mission and provide the tools to achieve them.
13. Baseline
    a. In the CyberVR™ context the baseline(s) represents a read-only subset of the ingested environment. The baseline is the gold-copy from where a canvas(es) is deployed. Its relevance to CyberVR™ is the ability to have tamper proof copies from where canvas(es) can be consistently created.

14. Canvas
   a. The Canvas is a collection of VMs and associated resources (such as compute, storage, and networking) that can be modified by the simulation author by adding components and/or executing actions that will make up the stage(s) in each of the exercise(s) required by the simulation. There may be more than one Canvas per simulation.
   b. Examples of modifications on the canvas include, but are not limited to:
      i. the selection of the VMs to be modified in a specific canvas
      ii. addition or modification of hardware, software, and data to the VMs
      iii. program execution to modify a VM state in a specific way
15. Workspace
   a. A workspace is a collection of VMs and their resources (such as compute, storage, and networking) that can be accessed and modified by participants of the simulation. Workspaces are deployed from stages.
16. Simulation
   a. A simulation is a collection of exercises and stages.
17. Exercise
   a. An exercise is a logical collection of stage(s).
18. Stage
   a. A stage is a read only, non-modifiable collection of VMs and their resources (such as compute, storage, and networking) that the author can save as he/she makes modifications on the canvas. When saved, a stage becomes part of an exercise and can be deployed to a workspace. Participants in the simulation use the workspace to achieve the mission associated with each stage.
   b. A stage is the combination of a set of objectives, tools, and supporting environment
19. Zero overhead data copy (ZODC):
   a. This is a feature of the technology used in the repository that allows the different users of the system to create practically instant copies of specific of the desired VMs or other data resources without generating overhead in terms of additional physical space or I/O. Normally it is implemented by creating logical copies that operate as independent copies. The Prepare, Deploy, and Conduct portions of CyberVR™ make extensive use of this capability in order to deliver a high degree of agility to every part of the workflow
20. VM
21. Modification
22. Realistic simulations:
23. Architected
24. Comprehensive cyber security full life cycle simulations
25. Cyber drill creation workspace
26. Cyber Drill Author
27. CyberVR™ Exercise
28. Damages to be identified and remediated
29. Desired Exercise Scenario
30. Editable version
31. Equivalent Network
32. Exercise Artifacts
33. Exercise Objectives
34. Exercise participants
35. Fast
36. High fidelity copy
37. High fidelity copy can be made from the production environment or from the existing DR environment
38. Hyper converged infrastructure capable of in-line deduplication and zero overhead data copies
39. Ingested environment
40. Network Discovery Application
41. On premise environment
42. Practical
43. Protected Gold Copy
44. Quickly and automatically restored to its initial state
45. Quickly deployed
46. Realistic Cyber Drill
47. Rented or owned by the customer
48. SCEDS ingest mechanism
49. Self-contained easily deployable system (SCEDS)*
50. Server Landscape
51. Service validation mechanism
52. Simulation Author
53. Special-purpose low footprint data-center-in-a-box
54. Startup sequence
55. Updated Stage Starting Point
56. ZODC
57. Authoring Workspace:
   a. Computing environment designed to efficiently execute the tasks associated with the creation of the exercises that make up a specific simulation. Examples of tasks include, but are not limited to:
      i. the selection of the VMs to be modified in a specific canvas
      ii. addition or modification of hardware, software, and data to the VMs
      iii. program execution to modify a VM state in a specific way
   b. As the VMs reach the state desired by the author the workspace enables the publication of the state as an exercise stage on the exercise catalog. The stages on the exercise catalog are also baselines that can be used to create other canvas(es) in any simulation. To make the exercise from the exercise catalog available to participants, the operator will make available in an execution workspace modifiable copies of stages involved in the exercise.
   c. The authoring workspace makes possible the creation of realistic exercises that are based on copies of the ingested environment. In this way participants are able to identify specific and actionable gaps in their response plans, skills deficiencies, etc.

The embodiments and descriptions disclosed in this specification are contemplated as being usable separately, and/or in combination with one another.

Apparatus embodiments of the present invention appear below.

In some embodiments, a system for cyber exercises which will comprise replicas of real life computing environments, where these replicas are adapted for participant interaction, and where these replicas comprise logical elements such as startup sequences of individual components.

In some embodiments, said replicas comprise one or more virtual machines, or VMs.

In some embodiments, said replicas can be made from systems in use, or from systems at rest.

In some embodiments, said replicas comprise virtual machines, which are organized into application dependency groups.

In some embodiments, application dependency groups comprise components such as startup and shutdown sequences and data flow.

In some embodiments, an application dependency finder is adapted to identify application dependency groups.

In some embodiments, an application dependency finder is adapted to discover how different computers, physical or virtual, are dependent on each other to deliver a specific service.

In some embodiments, said replicas are made from computer systems in use by making a point-in-time copy.

In some embodiments, the point-in-time copy is adapted to be moved or copied to a repository in a format that makes possible to start that point in time copy as a virtual machine inside the repository.

In some embodiments, the point-in-time copy includes all components in an application dependency group.

In some embodiments, said replicas are housed in one or more repositories.

In some embodiments, said replicas are housed in one or more repositories, and the repository is adapted to be utilized with data deduplication.

In some embodiments, said replicas are housed in one or more repositories, and a repository is adapted to be utilized with parallelized data ingestion.

In some embodiments, said replicas are housed in one or more repositories, and a repository is adapted to be utilized with zero overhead data copy (ZODC) techniques, which comprise creation of logical copies that operate as independent copies.

In some embodiments, an application dependency group comprises information which describes how different computers, physical or virtual, are dependent on each other and/or interact through information exchange, non-electronic dependencies, startup sequences, shutdown sequences, and/or data flow.

In some embodiments, a virtual-machine canvas comprises a collection of virtual machines and associated computing resources.

In some embodiments, a read-only canvas baseline is adapted to serve as a master copy for use in creating one or more virtual-machine canvases.

In some embodiments, a stage comprises a read-only canvas baseline, a set of objectives and tools, and a supporting environment.

In some embodiments, a system comprises an authoring workspace, which comprises a computing environment which is adapted to execute creation tasks associated with the creation of the exercises in a simulation.

In some embodiments, said creation tasks comprise selection of which virtual machines are to be modified in a specific canvas.

In some embodiments, said creation tasks comprise addition or modification of hardware, software, and data to virtual machines.

In some embodiments, said creation tasks comprise program execution to modify a virtual machine state in a specific way.

In some embodiments, the authoring workspace is adapted to enable publication of an exercise stage.

In some embodiments, publication of an exercise stage comprises adding said exercise stage to an exercise catalog.

In some embodiments, stages on the exercise catalog are adapted to be used as baselines that can be used to create other canvas(es) in any simulation.

In some embodiments, the exercise catalog is adapted to allow participants to access exercises.

In some embodiments an execution workspace is adapted to allow an operator to make available modifiable copies of stages involved in an exercise.

Method embodiments of the present invention appear below.

In some method embodiments, a method for cyber exercises will comprise the steps of:
creating virtual machine replicas of computing systems, and
creating a canvas, wherein the canvas comprises a collection of virtual machines and associated computing resources, and
using an application dependency finder to analyze startup and shutdown sequences.

In some method embodiments, said virtual machine replicas are made by creating a point-in-time copy of computing systems which are made from systems in use.

In some method embodiments, said virtual machine replicas are made by creating backups or clones of computing systems which are made from systems at rest.

Some method embodiments will comprise the additional step of: the additional step of: moving or copying a virtual machine replica to a repository.

Some method embodiments will comprise the additional step of: the additional step of: monitoring ingestion of a real-life computing environment into a repository.

Some method embodiments will comprise the additional step of: implementing parallelization to maximize data transfer into a repository.

Some method embodiments will comprise the additional step of: identifying services to ingest.

Some method embodiments will comprise the additional step of: identifying specific computers involved.

Some method embodiments will comprise the additional step of: identifying an order in which to pause the computing systems to create application-consistent point-in-time replicas.

Some method embodiments will comprise the additional step of: using a read-only canvas baseline to serve as a master copy for use in creating one or more virtual-machine canvases.

Some method embodiments will comprise the additional step of: using zero-overhead data copy techniques to create practically instant copies of virtual machines or other data resources, by creating logical copies that operate as independent copies.

Some method embodiments will comprise the additional step of: using an authoring workspace to efficiently execute tasks associated with creation of exercises that make up a specific simulation.

Some method embodiments will comprise the additional step of: selection of virtual machines to be modified in a specific canvas.

Some method embodiments will comprise the additional step of: addition or modification of hardware, software, and data to virtual machines.

Some method embodiments will comprise the additional step of: program execution to modify a VM state in a specific way.

Some method embodiments will comprise the additional step of: utilizing a workspace to enable publication of a state as an exercise stage on an exercise catalog.

Some method embodiments will comprise the additional step of: making an exercise from an exercise catalog available to participants by making available, in an execution workspace, modifiable copies of stages involved in the exercise.

Some method embodiments will comprise the additional step of: creating exercises that are based on copies of an ingested environment.

A method for cyber exercises, comprising the steps of:
selecting machines to include in a simulation,
copying the machines to an environment by ingestion of machine content,
creating a model of a network where the machines operate,
validating that the environment works as expected,
converting the environment to a baseline which is adapted to be deployed and used,
defining simulation objectives,
deploying one or more canvases from the baseline,
configuring the one or more canvases to a required state,
saving each canvas as a stage,
selecting, from a simulation catalog, a stage to be deployed,
deploying the stage to a workspace, which comprises a modeled network, and
connecting to a deployed stage and attempting to solve the stage's objectives.

Some method embodiments will comprise the additional step of:
determining whether forensics are needed, and if so, duplicating a simulation environment or returning a simulation environment to a specific point-in-time.

Some method embodiments will comprise the additional step of:
determining whether forensics are needed, and if not, conducting post-stage review to determine whether to repeat or to move on to another stage to be simulated.

A method for cyber exercises, comprising the steps of:
selecting a representative group of virtual machines for an exercise,
using a virtual machine application dependency finder to identify virtual machines supporting services,
validating or creating a startup sequence for one or more selected services,
identifying a service validation mechanism to determine that the one or more selected services are operating as expected,
modeling a user network in a virtualized environment, and
using a network discovery application to produce an equivalent network and implement it in a virtual realm.

Some method embodiments will comprise the additional steps of:
creating a fast, high-fidelity copy of a virtualized environment, and
using an infrastructure which is adapted for in-line deduplication and zero-overhead data copies to receive a source environment into a self-contained, easily deployable system.

Some method embodiments will comprise the additional step of:
validating a startup sequence.

Some method embodiments will comprise the additional step of:
creating a startup sequence.

Some method embodiments will comprise the additional steps of:
validating an ingested environment, and
using a zero-overhead data copy mechanism to create one or more protected copies ("gold copies") of the ingested environment that are adapted to be quickly and automatically restored to an initial state.

Some method embodiments will comprise the additional steps of:
defining an exercise objective,
identifying a number of stages required to achieve desired objectives,
creating a baseline using zero-overhead data copy,
Presenting an editable version of one or more protected copies ("gold copies") of the ingested environment into a workspace controlled by a cyber drill author,
Generating a specific exercise from the baseline and deploying its virtual machines in an initial state canvas,
editing a canvas,
using zero-overhead data copy to save the edited canvas into a logical object,
creating a canvas using zero-overhead data copying,
making changes in the canvas until a desired exercise scenario is ready,
adding tools and threats to the exercise scenario,
applying damages to be identified and remediated by exercise participants,
selecting a stage starting point for a next stage,
making changes to deliver a desired scenario for a specific stage,
creating an updated stage starting point with these changes,
saving an updated stage starting point as a new stage,
repeating previous steps until all stages for a specific exercise are finalized, and
grouping these stages in an exercise, and
storing the exercise in an exercise catalog.

Some method embodiments will comprise the additional steps of:
selecting a stage to be deployed from an exercise catalog,
initiating automatic deployment of a selected stage using a modeled network and participant access, and
attempting to achieve a mission using tools obtained from an original production environment or from an exercise designer.

Some method embodiments will comprise the additional step of:
using zero-overhead data copy to present virtual machines at a desired exercise stage, start the virtual machines in a particular sequence, and initiate periodic full backups of the virtual machines.

In some method embodiments, the stage is adapted to be returned to a previous point-in-time by a user.

BRIEF DESCRIPTION OF THE DRAWINGS

FIG. 3 shows a process relating to duplication and/or ingesting an environment to be used in cyber exercises.

FIG. 5 shows a process relating to executing cyber exercises.

DETAILED DESCRIPTION OF THE INVENTION

Figure 1:
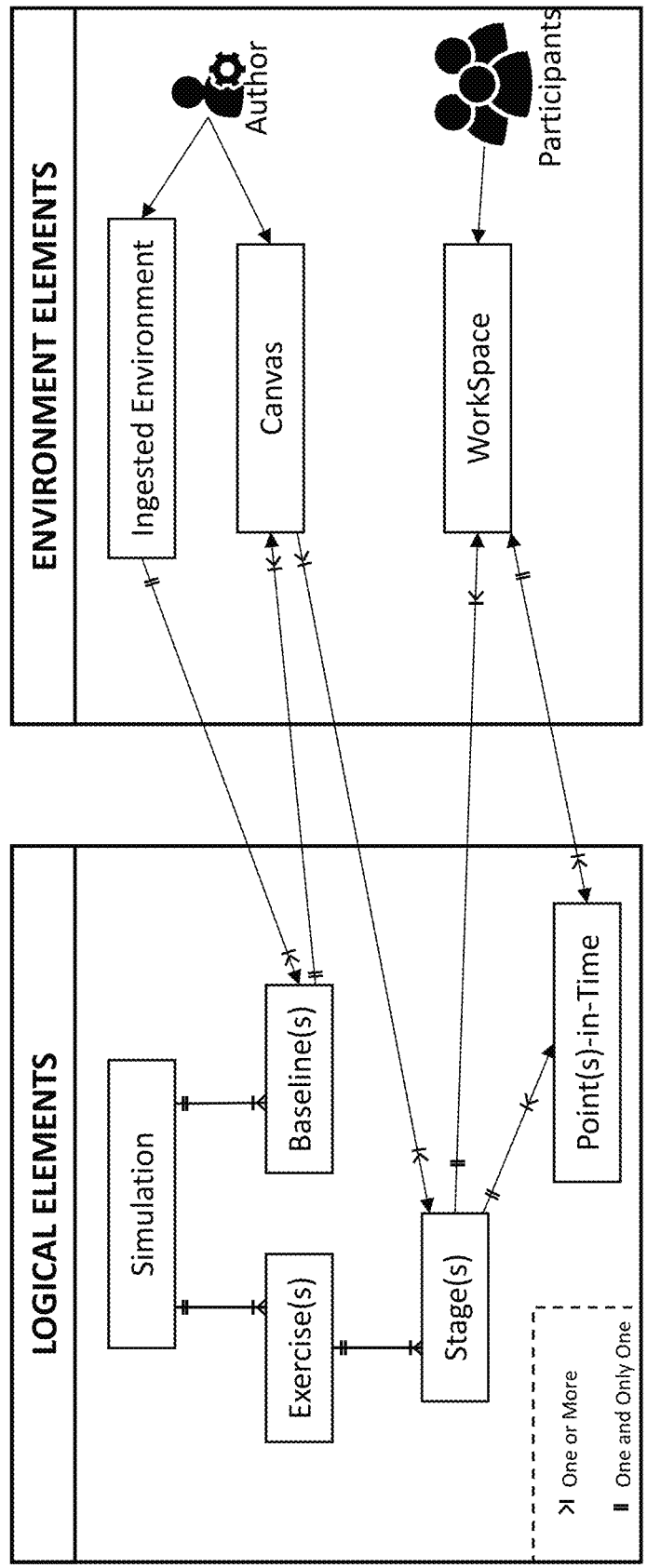
FIG. 1 shows a diagram which indicates relationships between logical elements and environment elements of the invention.

The following detailed description of the invention refers to the accompanying figures. The description and drawings do not limit the invention; they are meant only to be illustrative of exemplary embodiments. Other embodiments are also contemplated without departing from the spirit and scope of the invention.

Referring now to the drawings, embodiments of the invention are shown and disclosed.

FIG. 1 shows a diagram which indicates relationships between logical elements and environment elements of the invention. In this embodiment, a simulation is a collection of exercises and stages, and combines these exercises and stages with one or more baselines, where these one or more baselines have been created from an ingested environment. A baseline can be adapted to serve as a master copy for use in creating one or more canvases, such as virtual-machine canvases. There may be more than one canvas per simulation. One exercise can comprise one or more stages. One stage can comprise one or more point(s)-in-time. Also, one stage can be used to create one or more workspaces. One workspace can be used to create one or more point(s)-in-time. Additionally, an author (such as a cyber drill author or a simulation author) can modify, and can save modifications to, an ingested environment and/or a canvas.

Figure 2:
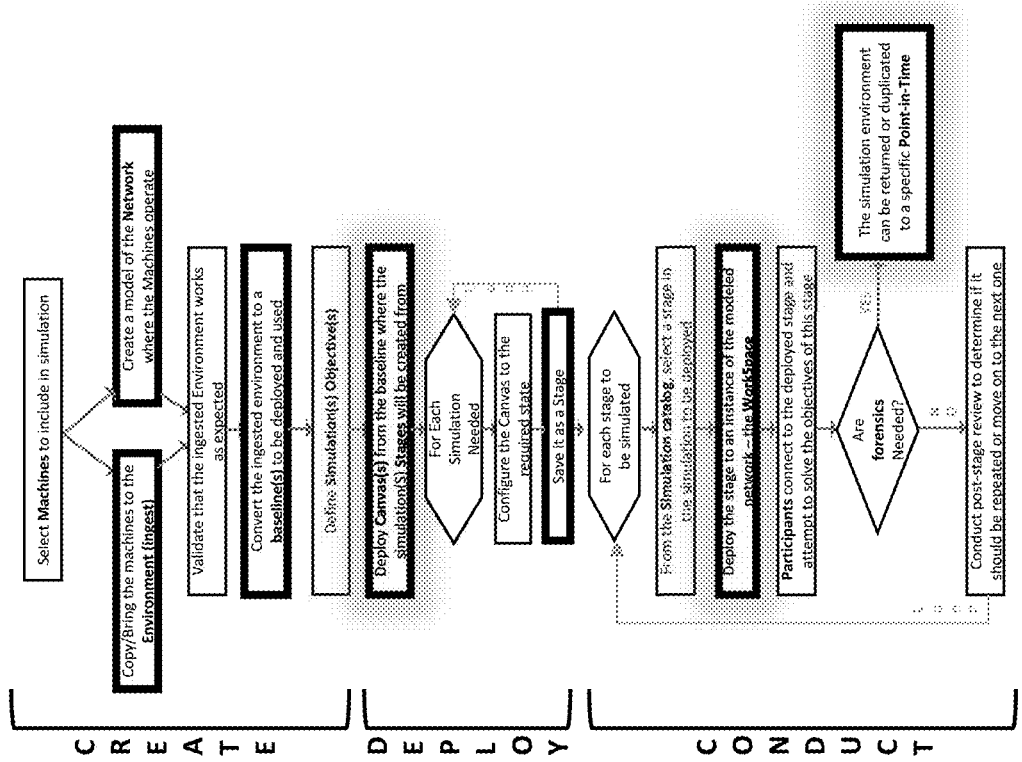
FIG. 2 shows a flow chart which depicts components of processes to create, deploy, and conduct simulations.

FIG. 2 shows a process which has been divided into the phases of Create, Deploy, and Conduct. The first step in the Create phase is to select machines to include in a simulation. The next steps are to copy, bring, and/or ingest the machines which have been selected into an environment, thereby creating an ingested environment, and to create a model of a network where the machines operate. The next step is to validate that the ingested environment works as expected. The next step is to convert the environment to one or more baseline to be deployed and used. The next step is to define objective(s) of a simulation or simulations. The first step in the Deploy phase is to deploy one or more canvases from a baseline where simulation stages will be created from. The next steps are to configure a canvas to a required state, save it as a stage, and repeat these steps for each simulation needed. The first step in the Conduct phase is to select a stage to be deployed from a simulation catalog. The next steps are to deploy the stage to a workspace which functions as an instance of a modeled network, to allow participants to connect to the stage which has been deployed, to allow participants to attempt to solve the objectives of this stage, and to determine if forensics are needed; if forensics are needed, the environment can be returned or duplicated to a specific point-in-time; if forensics are not needed, a post-stage review is conducted to determine whether to repeat or move on to the next one; if a determination is made to move on to the next one, the preceding steps are repeated for another stage to be simulated.

FIG. 3 shows steps of an Environment Duplication/Ingest phase of a cyber war game preparation process, and describes steps and methods which are used for virtual machine exercises.

Figure 4:
FIG. 4 shows a process relating to preparing for cyber exercises.

FIG. 4 shows steps of an Environment Duplication/Ingest phase of a cyber war game preparation process, and describes steps and methods which are used to define an exercise objective, create a baseline, generate a specific exercise, create a canvas, select a stage starting point, make changes needed to deliver a desired scenario, save an updated stage starting point as a new stage, repeating earlier steps until all stages for the specific exercise are finalized, and grouping the stages in an exercise stored in an exercise catalog.

FIG. 5 shows steps of an Exercise Execution phase of a cyber war game preparation process, and describes steps and methods which are used to select and deploy stages from an exercise catalog, as well as conducting and executing a mission and conducting post-stage review.

We claim:

1. A system for cyber exercises which will comprise replicas of real life computing environments, where these replicas are adapted for participant interaction, and where these replicas comprise logical elements such as startup sequences of individual components, wherein said replicas comprise one or more virtual machines, or VMs, and wherein said replicas can be made from systems in use, or from systems at rest, and also wherein a system comprises an authoring workspace, which comprises a computing environment which is adapted to execute creation tasks associated with the creation of the exercises in a simulation, and also wherein the authoring workspace is adapted to enable publication of an exercise stage, wherein publication of an exercise stage comprises adding said exercise stage to an exercise catalog, and wherein stages on the exercise catalog are adapted to be used as baselines that can be used to create other canvas(es) in any simulation, and also wherein the exercise catalog is adapted to allow participants to access exercises, and wherein an execution workspace is adapted to allow an operator to make available modifiable copies of stages involved in an exercise.

2. A method for cyber exercises, comprising the steps of:
creating virtual machine replicas of computing systems,
creating a canvas, wherein the canvas comprises a collection of virtual machines and associated computing resources,
using an application dependency finder to analyze startup and shutdown sequences,
moving or copying a virtual machine replica to a repository,
monitoring ingestion of a real-life computing environment into a repository,
and also comprising the additional steps of:
using an authoring workspace to efficiently execute tasks associated with creation of exercises that make up a specific simulation,
selection of virtual machines to be modified in a specific canvas,
addition or modification of hardware, software, and data to virtual machines,
program execution to modify a VM state in a specific way,
utilizing a workspace to enable publication of a state as an exercise stage on an exercise catalog,
making an exercise from an exercise catalog available to participants by making available, in an execution workspace, modifiable copies of stages involved in the exercise, and
creating exercises that are based on copies of an ingested environment.

3. A method for cyber exercises, comprising the steps of:
selecting machines to include in a simulation,
copying the machines to an environment by ingestion of machine content,
creating a model of a network where the machines operate,
validating that the environment works as expected,
converting the environment to a baseline which is adapted to be deployed and used,
defining simulation objectives,
deploying one or more canvases from the baseline,
configuring the one or more canvases to a required state,
saving each canvas as a stage,
selecting, from a simulation catalog, a stage to be deployed,
deploying the stage to a workspace, which comprises a modeled network, connecting to a deployed stage and attempting to solve the stage's objectives, determining whether forensics are needed, and if so, duplicating a simulation environment or returning a simulation environment to a specific point-in-time, and determining whether forensics are needed, and if not, conducting post-stage review to determine whether to repeat or to move on to another stage to be simulated.

4. A method for cyber exercises, comprising the steps of:

selecting a representative group of virtual machines for an exercise, using a virtual machine application dependency finder to identify virtual machines supporting services, validating or creating a startup sequence for one or more selected services, identifying a service validation mechanism to determine that the one or more selected services are operating as expected, modeling a user network in a virtualized environment, using a network discovery application to produce an equivalent network and implement it in a virtual realm, creating a fast, high-fidelity copy of a virtualized environment, using an infrastructure which is adapted for in-line deduplication and zero-overhead data copies to receive a source environment into a self-contained, easily deployable system, validating an ingested environment, and using a zero-overhead data copy mechanism to create one or more protected copies ("gold copies") of the ingested environment that are adapted to be quickly and automatically restored to an initial state, defining an exercise objective, identifying a number of stages required to achieve desired objectives, creating a baseline using zero-overhead data copy, presenting an editable version of one or more protected copies ("gold copies") of the ingested environment into a workspace controlled by a cyber drill author, generating a specific exercise from the baseline and deploying its virtual machines in an initial state canvas, editing a canvas, using zero-overhead data copy to save the edited canvas into a logical object, creating a canvas using zero-overhead data copying, making changes in the canvas until a desired exercise scenario is ready, adding tools and threats to the exercise scenario, applying damages to be identified and remediated by exercise participants, selecting a stage starting point for a next stage, making changes to deliver a desired scenario for a specific stage, creating an updated stage starting point with these changes, saving an updated stage starting point as a new stage, repeating previous steps until all stages for a specific exercise are finalized, and grouping these stages in an exercise, storing the exercise in an exercise catalog, selecting a stage to be deployed from an exercise catalog, initiating automatic deployment of a selected stage using a modeled network and participant access, attempting to achieve a mission using tools obtained from an original production environment or from an exercise designer, and using zero-overhead data copy to present virtual machines at a desired exercise stage, start the virtual machines in a particular sequence, and initiate periodic full backups of the virtual machines.

\* \* \* \* \*